United States Patent [19]
Davulcu et al.

[11] Patent Number: 5,389,132
[45] Date of Patent: Feb. 14, 1995

[54] THERMAL INK-JET EXHIBITING REDUCED KOGATION

[75] Inventors: Akin H. Davulcu; Salman Rashid; James D. Story, all of Houston, Tex.

[73] Assignee: JetFill, Inc., Houston, Tex.

[21] Appl. No.: 190,316

[22] Filed: Feb. 2, 1994

[51] Int. Cl.$^6$ .............................................. C09D 11/02
[52] U.S. Cl. ................................ 106/20 R; 106/22 R
[58] Field of Search ............................ 106/20 R, 22 R

[56] References Cited

U.S. PATENT DOCUMENTS

| | | | |
|---|---|---|---|
| 4,790,880 | 12/1988 | Miller | 106/22 R |
| 5,061,316 | 10/1991 | Moffatt | 106/22 R |
| 5,108,501 | 4/1992 | Moffatt | 106/22 R |
| 5,141,556 | 8/1992 | Matrick | 106/22 R |
| 5,165,968 | 11/1992 | Johnson et al. | 106/22 R |
| 5,169,437 | 12/1992 | You | 106/20 D |
| 5,268,027 | 12/1993 | Chan et al. | 106/22 R |

OTHER PUBLICATIONS

P. L. Gender, et al.: "Thermal Decomposition (Kogation) of Ethylene Glycol and Diethylene Glycol in Thermal Ink-Jet Inks," *IS&Ts* 8th Int'l. Congress on Advances in Non-Impact Printing Technologies, Oct. 25-30, 1992, pp. 308-315.

D. J. Halko, et al.: "Kogation: A New Mechanism and Solution," 9th *Int'l. Congress on Advances in Non-Impact Printing Technologies*, Oct. 4-8, 1993, pp. 269-272.

K. Shirota, et al.: "Kogation of Inorganic Impurities in Bubble Jet Ink," 9th *Int'l. Congress on Advances in Non-Impact Printing Technologies*, Oct. 4-8, 1993, pp. 273-274.

*Primary Examiner*—Helene Klemanski
*Attorney, Agent, or Firm*—Browning, Bushman, Anderson & Brookhart

[57] ABSTRACT

A composition for use as an ink in thermal ink-jet printers comprising water, a compatible colorant, and certain 2-substituted 1,3-propanediols as humectants, the compositions providing a substantially kogation-free ink.

11 Claims, 9 Drawing Sheets

THERMAL INK-JET EXHIBITING REDUCED KOGATION

BACKGROUND OF THE INVENTION

1. Field of the Invention

The present invention relates to thermal ink-jet printing and, more particularly, to inks for use in thermal ink-jet printers.

2. Description of the Prior Art

Thermal ink-jet printers, as is well known, employ a resistor element in a chamber provided with an orifice for ink to enter from a plenum, which in turn is connected to an ink reservoir. Typically, anywhere from 50 to well over 100 such resistor elements are arranged in a linear or rectangular array, thereby making up the print head. Each resistor element is associated with a nozzle and a nozzle plate through which the ink is expelled toward a substrate or print medium. The entire assembly of print head and reservoir comprise an ink-jet pen. In operation, a drop of ink is formed on the resistor surface. Heating of this drop by the resistor leads to explosive bubble formation that forces the drop of ink from the resistor through the nozzle and toward the print medium.

A problem that frequently arises with inks used in such thermal ink-jet applications is that the repeated heating of the resistor elements (and hence the ink) over several tens of millions of firings can cause breakdown of the ink, especially the organic components (in many cases, the dye molecule itself), with consequent fouling of the resistor element surface. This process is termed "kogation," strictly defined in the art as the buildup of residue (koga) on the resistor surface, and in many cases actually visible to the human eye upon microscopic examination of the resistor element. This buildup of koga degrades pen performance over time in that it acts as an insulating barrier between the ink and the resistor element, thereby reducing the efficiency of the vaporization process that takes place at the resistor and consequently reducing the volume of the ink droplet ejected from the print head onto the print medium. The problem ultimately manifests itself in the form of poor print quality on the print medium.

Thermal ink-jet inks typically contain a glycol, particularly ethylene glycol and/or diethylene glycol, as a humectant to reduce evaporation losses. Such evaporation leads to unacceptable crusting and clogging in the nozzles of the ink-jet pen, in part because the viscosity of the ink compositions increases substantially after some of the volatile components have evaporated.

It has recently been suggested that humectants such as ethylene glycol and diethylene glycol contribute to the problem of kogation. Although these compounds have been implicated in the kogation process, there is no conclusive evidence supporting the fact that the compounds themselves actually degrade at the resistor surface. When the actual koga is analyzed, it is found that the origin of the koga is predominantly the dye molecule and not the humectant (David J. Halko, "Kogation: A New Mechanism and Solution," 9th International Congress on Advances in Non-impact Printing Technologies, Oct. 4–8, 1993, Yokohama, Japan). This conclusion is based on the fact that the atomic percentages of the elements, usually carbon, sulfur, nitrogen, oxygen, and hydrogen found in the koga, are identical to that of the dye that is studied. It has also been shown that diethylene glycol will deposit polymeric materials (koga) at the resistor surface, as the ester linkage therein is thermally labile (P. L. Gender, et at., "Thermal Decomposition of Ethylene Glycol and Diethylene Glycol in Thermal Ink Jet Inks," 9th International Congress on Advances in Non-Impact Printing Technologies, Oct. 4–8, 1993, Yokohama, Japan). Thus, a theory is that, in essence, when incorporated into a thermal ink-jet ink, these humectants cause components of the ink to kogate. It seems clear that the buildup of koga at the resistor surface is the result of a thermo-chemical process wherein the dye and probably other components of the ink are transformed into some insoluble species (K. Shirota, et al., "Kogation of Inorganic Impurities in Bubble Jet Ink," 9th International Congress on Advances in Non-impact Printing Technologies, October 4–8, 1993, Yokohama, Japan; P. L. Gendler, et at., "IS&T," 8th International Congress on Advances in Non-impact Printing Technologies, 1992). Prior art workers have shown that the presence of Group I and Group II metal ions, particularly sodium, tend to increase the likelihood of kogation. Accordingly, much work has been directed toward removal of these deleterious ions. Since most inexpensive anionic dyes used in the industry are sodium salts of the corresponding basic dyes, research has focused on replacing the sodium cation with less active cations such as lithium, ammonium and various alkyl ammonium cations. Although elimination of deleterious ions such as sodium from the ink results in significant alleviation of kogation, the preparation procedures for the ink are so costly as to preclude widespread industry acceptance.

There have also been attempts to reduce kogation in thermal ink-jet inks by incorporating into the inks different compounds that ostensibly control kogation by various methods. See, for examples, U.S. Pat. Nos. 4,790,880; 5,108,501; and 5,169,437.

Despite the efforts to formulate thermal ink-jet inks that eliminate kogation, there remains the need for a thermal ink-jet ink that can be produced economically and that essentially eliminates kogation.

SUMMARY OF THE INVENTION

It is therefore an object of the present invention to provide an improved thermal ink-jet ink.

Another object of the present invention is to provide a thermal ink-jet ink that virtually eliminates, if not markedly reduces, kogation.

Still a further object of the present invention is to provide a method for reducing kogation in an ink used in thermal ink-jet printers.

The above and other objects of the present invention will become apparent from the drawings, the description given herein and the appended claims.

The novel thermal ink-jet inks or compositions of the present invention comprise water, a compatible colorant or dye, and from about 2% to about 20% by weight of a humectant. The humectant is a compound having the formula:

wherein X is an alkyl group having from 1 to 3 carbon atoms, $-NH_2$, $-CH_2NH$, and a cyclic ether moiety, or mixtures of such compounds.

In another aspect of the present invention, kogation in inks used in thermal ink-jet printers and that contain water and a compatible colorant is reduced by the incorporation into the ink of a humectant as described above.

BRIEF DESCRIPTION OF THE DRAWINGS

FIG. I is a plot of the rate of mass transfer dM/dt (g/sec) as a function of resistor firing cycles (millions) for an ink that does not kogate.

FIG. II is a plot similar to FIG. 1 for an ink that does kogate.

FIG. III is a plot similar to FIG. 1 for an ink in which diethylene glycol is used as the humectant.

FIG. IV is a plot similar to FIG. 1 in which 1,3-dioxane-5,5-dimethanol is used as the humectant.

FIG. V is a plot similar to FIG. 1 in which 2-methyl-1,3-propanediol is used as the humectant.

FIG. VI is a plot similar to FIG. I in which serinol is used as the humectant.

FIG. VII is a plot similar to FIG. I in which pentaerythritol is used as the humectant.

FIG. VIII is a plot similar to FIG. I in which trimethylolpropane (TMP) is used as the humectant at the 8% by weight level.

FIG. IX is a plot similar to FIG. I in which TMP is used as the humectant at the 10% by weight level.

DESCRIPTION OF THE PREFERRED EMBODIMENTS

Figure 1:
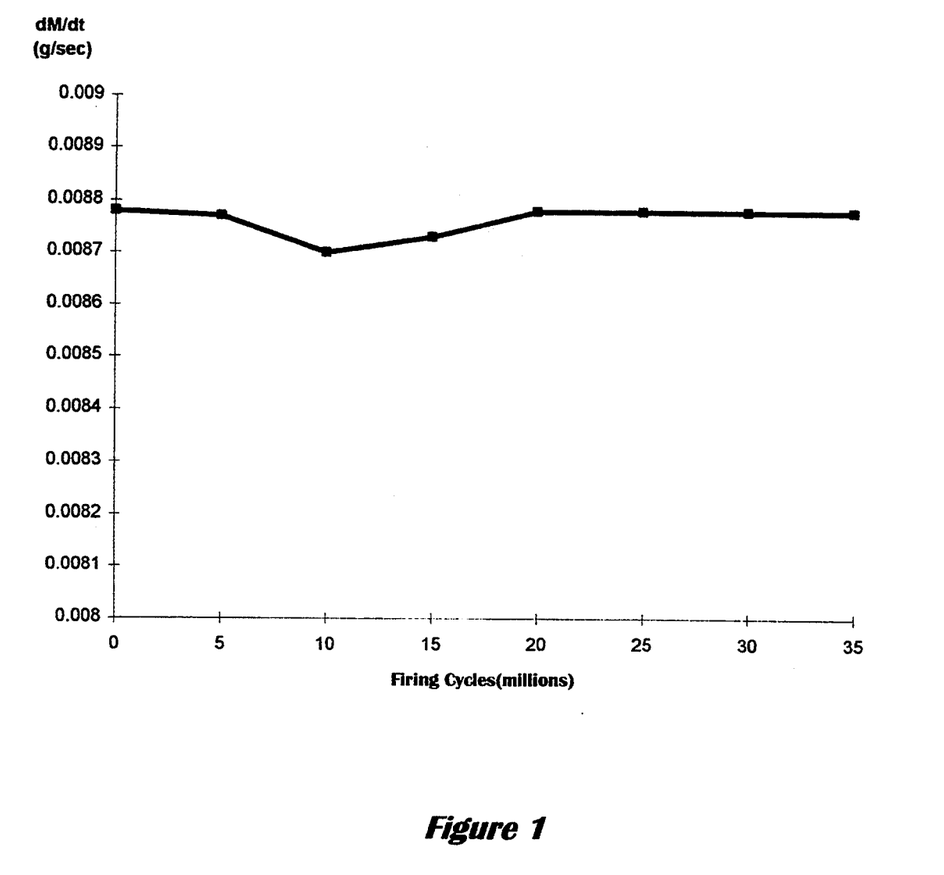
Figure 2:
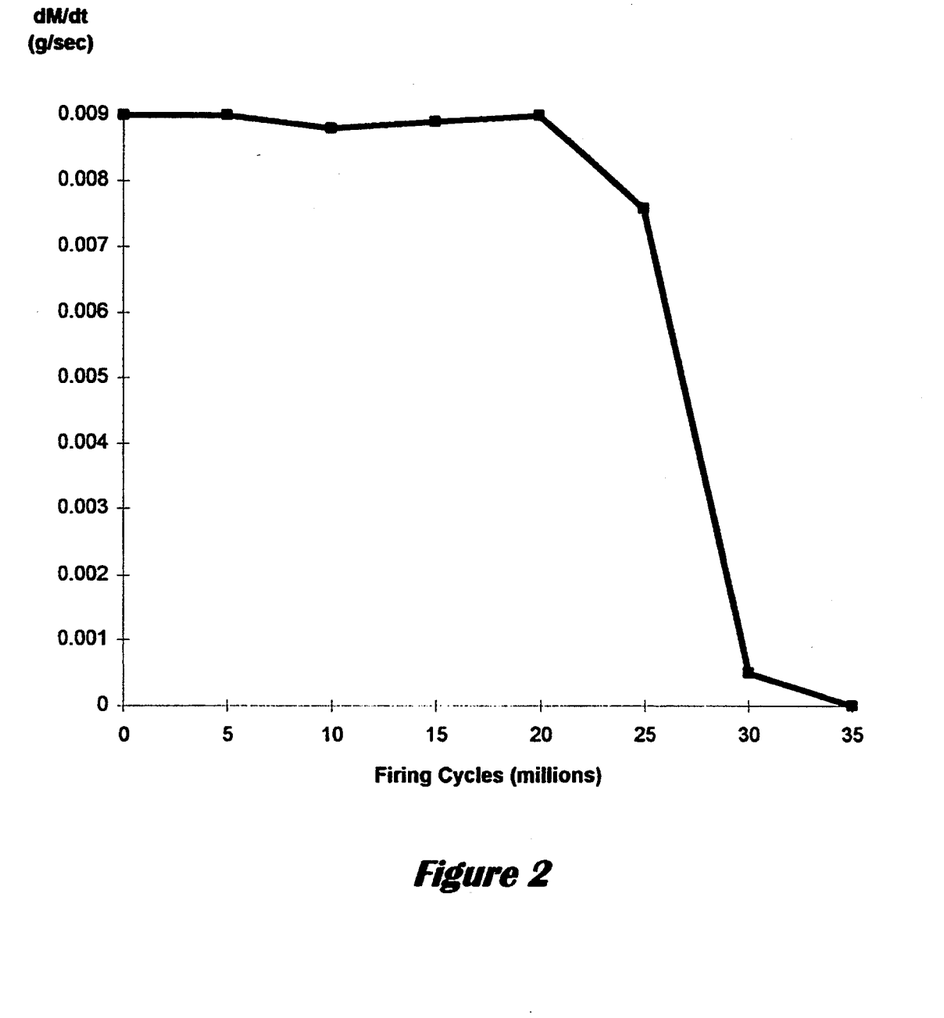
Figure 3:
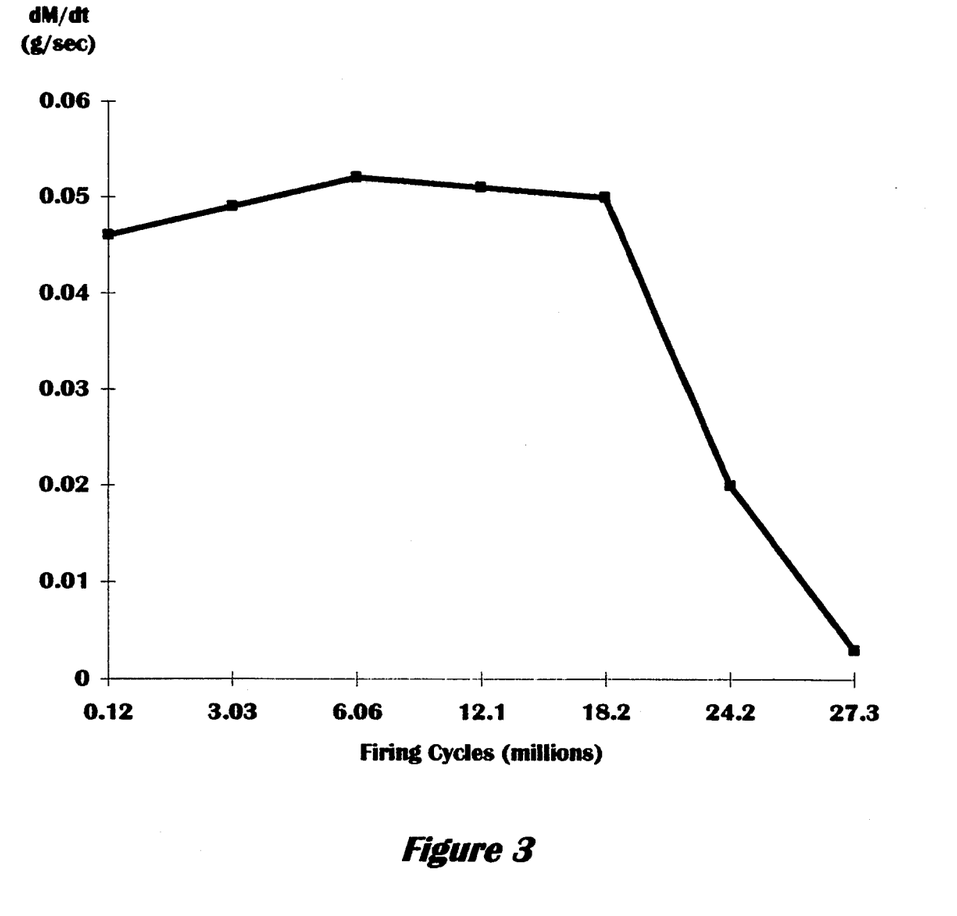
Figure 4:
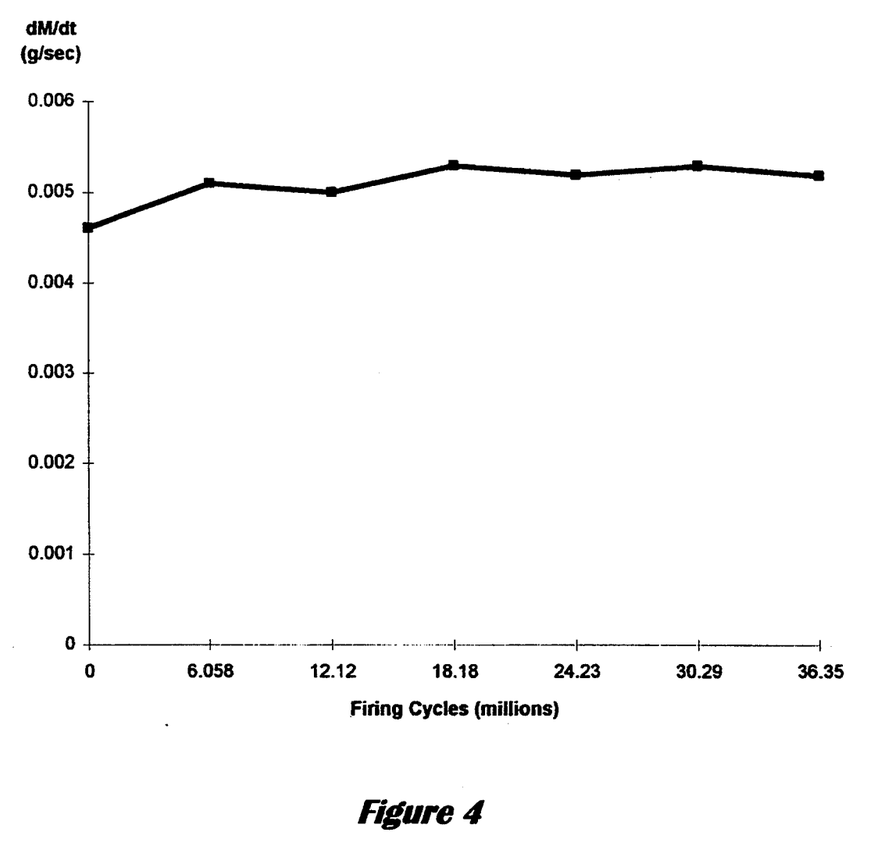
Figure 5:
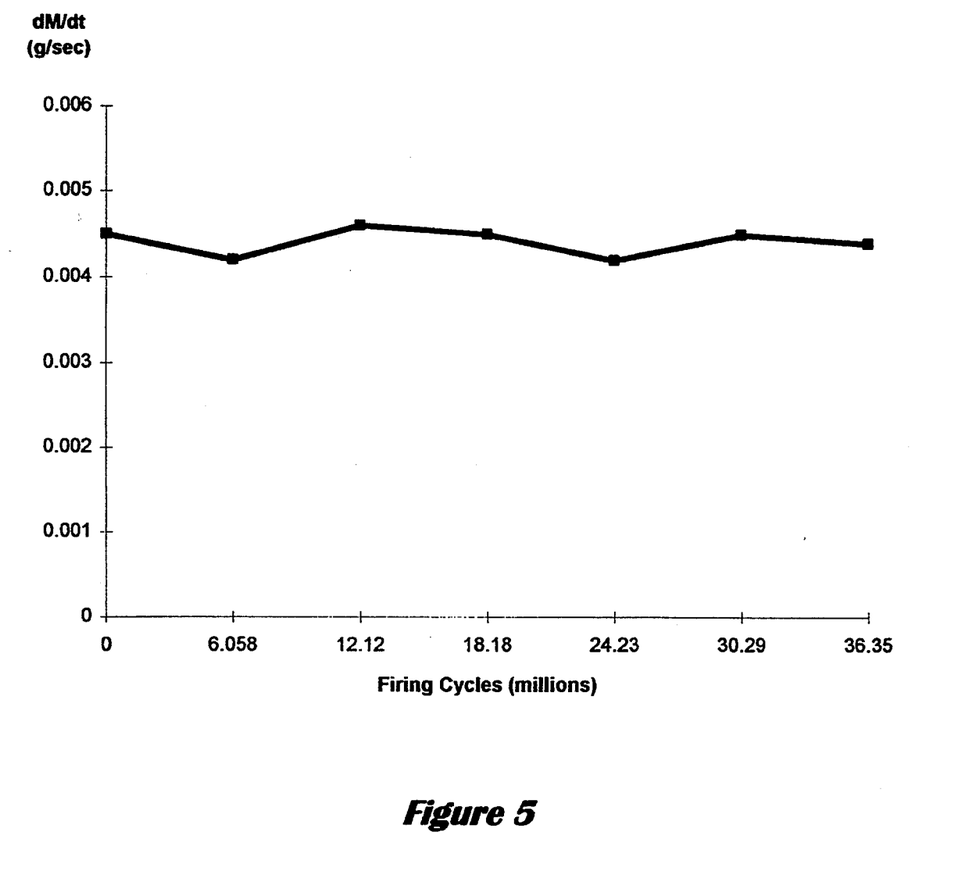
Figure 6:
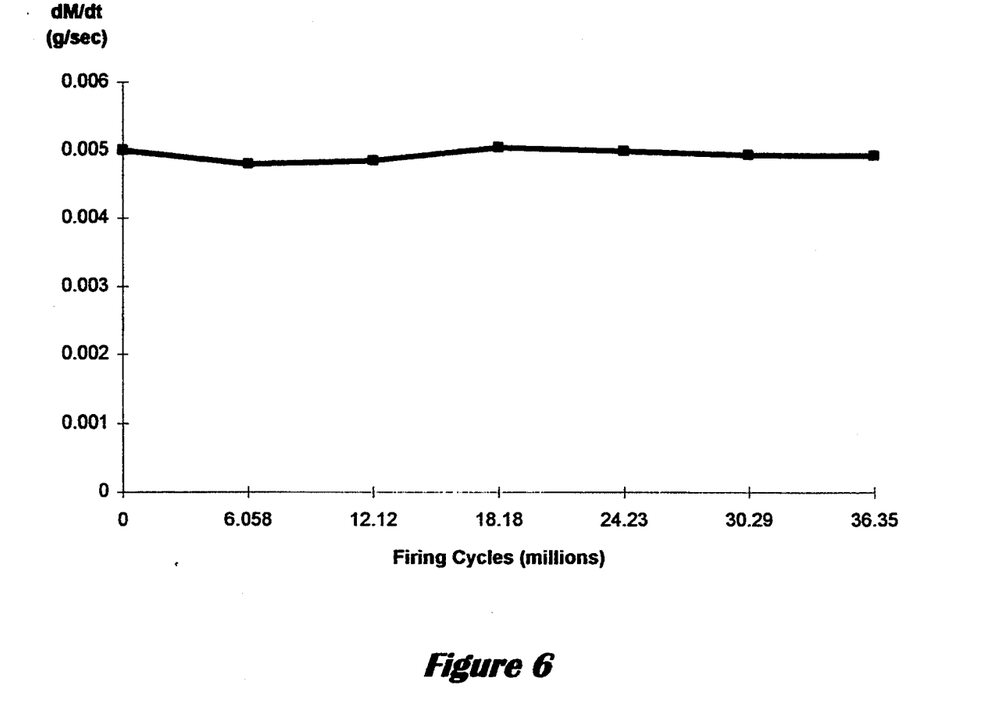
Figure 7:
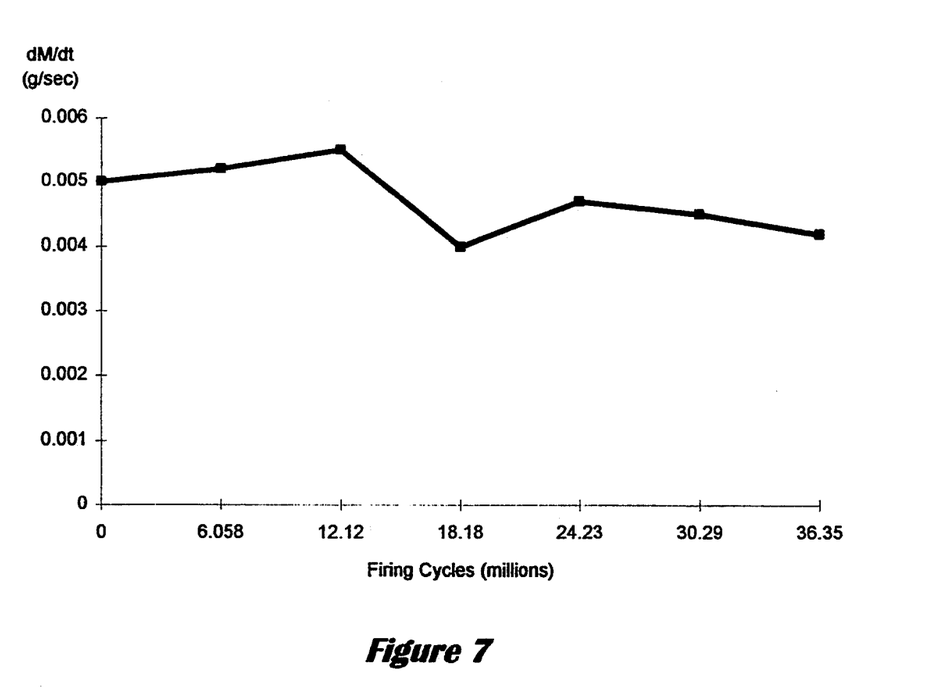
Figure 8:
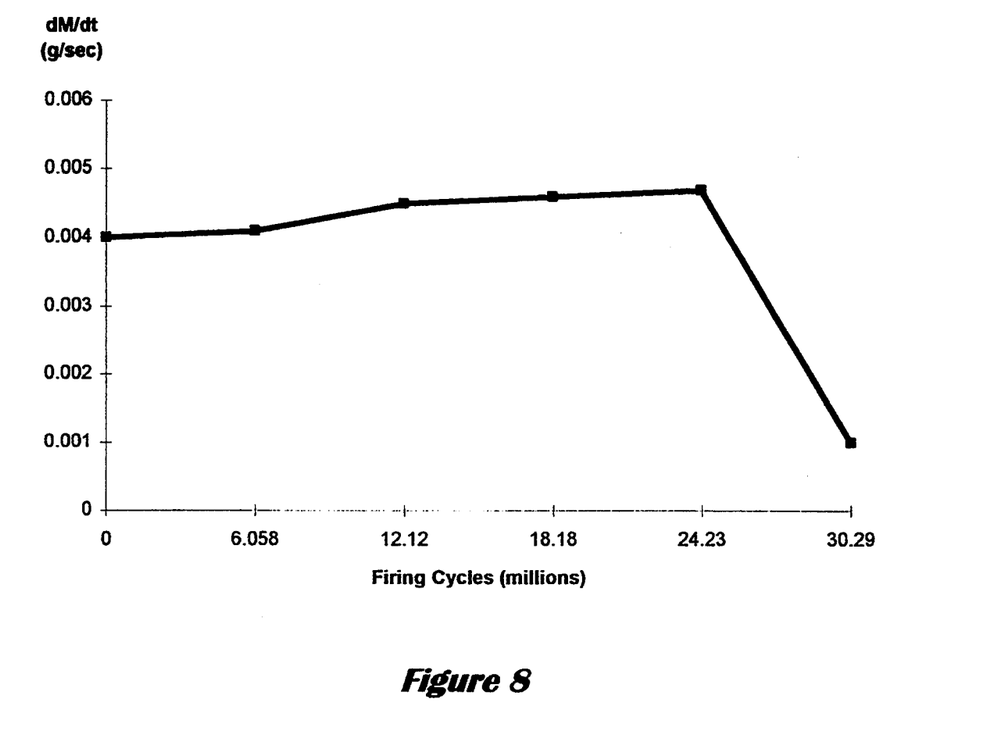
Figure 9:
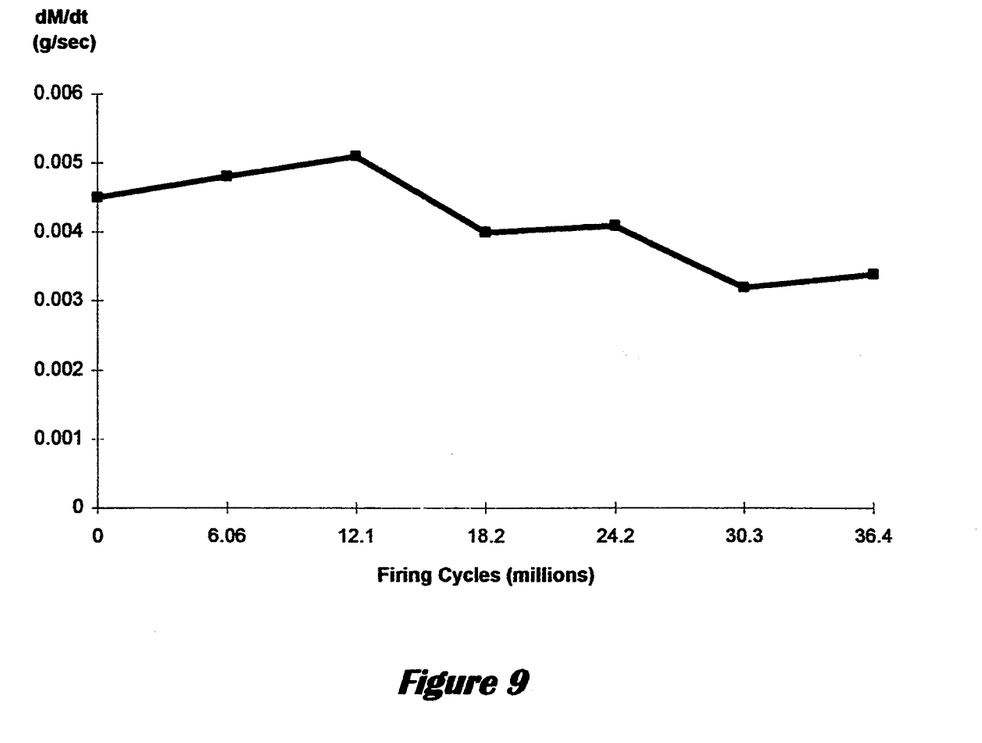

The present invention is based on the discovery that a certain, defined class of 2-substituted 1,3-propanediols unexpectedly reduce, indeed virtually eliminate, kogation of aqueous ink compositions used in thermal ink-jet printing. The inks of the present invention contain at least three components, namely, water, a colorant or dye, and the humectants disclosed herein.

The water, which will generally, be present in an amount of from about 65% to about 90% by weight of the ink is usually deionized water or at least water that has been freed of known components that contribute to kogation.

The "compatible colorant" or dye useful in the composition of the present invention, is any dye, commonly employed in such inks that is compatible, i.e., is soluble or dispersible, in the aqueous ink composition and that produces a visible image on the print medium. The particular colorant employed is not critical, provided that the colorant is stable at the temperatures of the printing process, does not chemically react with other components of the dye, and preferably is not poisonous or otherwise noxious. Anionic dyes are commonly employed in such inks. Chemically, the anionic dyes suitably employed in the compositions herein consist of azo, anthroquinones, triarylmethane and some stilbenes, thiazoles, phthalocyanines, and oxazines. Specific examples include (CI names) Food Black 2, Direct Black 19, Direct Blue 86, Acid Red 52, Acid Yellow 17, Acid Yellow 23, Acid Red 35, Direct Black 38, Direct Yellow 119, Acid Black 172, Direct Black 112, and the like. Generally speaking, the compatible colorant, or dye, will be present in the ink in an amount of from about 2% to about 10% by weight of solids (i.e., dye) based on the total weight of the ink composition.

The humectants used in the ink of the present invention have the following general formula:

wherein X is an alkyl group having from 1 to 3 carbon atoms, $-NH_2$, $-CH_2NH_2$, and a cyclic ether moiety. Mixtures of two or more humectants falling within the above formula can also be employed. The term "cyclic ether moiety" refers to a radical derived from a cyclic ether containing up to five carbon atoms and that can be reacted to form a 2-substituent of 1,3 propanediol that contains at least one oxygen atom in a cyclic structure and that does not deleteriously affect water solubility of the 2-substituted 1,3-propanediol to the point where the compound is ineffective. Non-limiting examples of such cyclic ethers include trimethylene oxide, tetrahydrofuran, dioxane, etc. The humectant will be present in the ink in an amount of from about 2% to about 20% by weight, preferably in an amount of from about 8% to about 15% by weight. It will thus be appreciated that, depending upon the precise humectant or mixture thereof selected, the composition can vary over rather wide limits. It will also be apparent to those skilled in the art that other known humectants can be incorporated, provided that the concentration of the 2-substituted 1,3-propanediol disclosed herein is sufficient to prevent kogation as that term is defined herein. Non-limiting examples of humectants defined by the above formula and useful in the ink of the present invention include 1,3-dioxane-5,5-dimethanol, serinol, 2-methyl-1,3-propanediol, and the like. An especially preferred humectant is 2-methyl 1,3-propanediol in an amount of from about 8% to about 12% by weight of the ink.

In addition to the water, the colorant, and the humectants, the ink can also contain one or more water-soluble, nonaqueous components or additives that enhance the ink with regard to improved solubility of other components, improved print quality (e.g., additives such as water-soluble polymeric materials including 2-polypyrrolidone can be added to improve print quality), improved shelf life of the ink (e.g., a biocide can be added to improve the shelf life of the ink), and the like. Additionally, components such as short-chain alcohols, e.g., isopropanol; alkanol amines, e.g., mono-, di-, and triethanol amine; amides, e.g., formamide and diethylformamide; sulfoxides, e.g., dimethylsulfoxide; sulfones, e.g., sulfolane; and heterocyclic amines, e.g., N-methyl-2-pyrrolidone; and 1,3-dimethyl-imidazolidinone. Generally speaking, additional components or additives, when employed, will be present in an amount of from about 0.1% to about 20% by weight of the ink.

As is well known to those skilled in the art, the viscosity and/or surface tension of thermal ink-jet inks can be adjusted by the addition of one or more components well known in the art. For example, additives such as polyethylene glycol, polyvinyl alcohol, and the like are known to increase the viscosity of such compositions, whereas additives such as N-methyl-2-pyrrolidone and the like are known to decrease the viscosity of such compositions. In addition, surfactants and ethanolamines can be added to adjust surface tension. In general, the surface tension and/or viscosity will be adjusted so as to provide acceptable results at the particular operating conditions.

In formulating the inks of the present invention, the components are combined and mixed until a substantially homogeneous composition is achieved. Such homogeneity can be accomplished, for example, by using blenders, magnetic stirrers, and the like, the blending being continued for a period of time sufficient to ensure homogeneity of the composition. Generally speaking, the mixing is conducted at ambient temperatures and pressures, although elevated temperatures can be employed to facilitate dissolution of the components, care being exercised to avoid loss of volatile components from the composition.

In determining which 2-substituted 1,3-propanediols are suitable for use in the present invention, the rate of mass transfer of ink dM/dt versus firing cycles (in millions) is determined. Since kogation is defined as the build-up of residue on the resistor surfaces from which ink is vaporized to effect printing, it follows that as the insulating layer builds, the efficiency of the ink vaporization process decreases, meaning less ink is vaporized per cycle. Accordingly less ink will be transferred to the print medium or substrate. The rate of mass transfer versus firing cycles can be determined as follows: To determine a baseline, i.e., dM/dt for zero firing cycles, a cartridge is charged with the ink of interest and placed in a printer cartridge, which is subsequently placed over the pan of an analytical balance. The analytical balance communicates with a PC via suitable interface, e.g., an RS232 interface. The printer is then started, and the PC records mass versus time data at a rate of 5 times per second for a duration of 4 minutes, thereby generating a linear curve of mass (g) versus time (sec). As is well known to those skilled in the art, the time rate of change of mass transfer dM/dt is simply the derivative (or slope) of the line. Determinations of dM/dt are taken approximately every 6 million firing cycles, and the continuity of the curve dM/dt versus number of firing cycles is assessed. The method for determining kogation, being based on empirical data, does not involve application of any derived equations or simplifying assumptions and is independent of the cartridge used in the study. Although any given cartridge may have a fundamentally different rate of mass transfer, the fact that the determination monitors changes in the rate of mass transfer precludes any difficulties that may arise in cartridge to cartridge variations.

It has been found that the humectants of the present invention possess a "kogation coefficient" such that dM/dt is substantially constant over the period zero to 30 million firing cycles. For a humectant defined by the above formula, and which is useful in the present invention, dM/dt will show a maximum decrease of 8 % over the range of zero to 30 million firing cycles.

By incorporating the humectants of the present invention in thermal ink-jet inks, it has been found that kogation is markedly reduced, if not totally eliminated. Additionally, no clogging or crusting problems are observed with ink compositions according to the present invention.

To more fully illustrate the present invention, the following non-limiting examples are presented. In the following examples, all percentages recited are weight percent based on the total weight of the ink-jet ink composition unless otherwise indicated. In formulating the inks, the following general procedure was employed: the mixture of components of the ink was stirred at room temperature for 2 hours or until a homogeneous mixture was obtained and filtered through cellulose acetate to 0.22 μm.

In the following examples, kogation testing was performed on a Hewlett-Packard Desk Jet Plus ink-jet printer using a Hewlett-Packard 51626A pen. Kogation was experimentally quantified via the real time monitoring of the rate of mass transfer dM/dt (g/sec) of ink from the print head during the course of the experiment. FIGS. I and II illustrate the relationship between dM/dt and the number of firing cycles (in millions) for a typical non-kogating and kogating ink, respectively.

EXAMPLE 1

This is a comparative example using a typical prior art thermal ink-jet ink employing diethylene glycol as the humectant. The formulation was as follows:

3.25 % Food Black 2[1]

[1]Food Black 2 was obtained from Miles/Mobay Chemical.

2.50% 2-pyrrolidone
2.50% Isopropanol
0.25 % Surfynol 485[2]

[2]Surfynol 485 is a surfactant prepared via ethoxylation (i.e., reaction with ethylene oxide) of an acetylenic diol distributed by Air Products.

81.50% Deionized Water
10.00% Diethylene Glycol
Kogation results are shown in FIG. III.

EXAMPLE 2

The formulation used in this example was as follows:
3.25 % Food Black 2
2.50% 2-pyrrolidone
2.50% Isopropanol
0.25 % Surfynol 485
81.50% Deionized Water
10.00% 1,3-dioxane-5,5-dimethanol
Kogation results are shown in FIG. IV.

EXAMPLE 3

The formulation used in this example was as follows:
2.50% 2-pyrrolidone
2.50% Isopropanol
0.25 % Surfynol 485
88.25 % Deionized Water
3.25 % Serinol
Kogation results are shown in FIG. VI.

EXAMPLE 4

This is another comparative example showing kogation results obtained using pentaerythritol as the humectant. The formulation used in this example was as follows:
3.25 % Food Black 2
2.50% 2-pyrrolidone
2.50% Isopropanol
0.25 % Surfynol 485
88.00 % Deionized Water
3.50% Pentaerythritol
Kogation results are shown in FIG. VII.

EXAMPLE 5

This is yet another comparative example showing kogation results obtained from an ink formulation employing a prior art humectant, trimethylolpropane. The formulation was as follows:
3.25% Food Black 2
2.50% 2-pyrrolidone
2.50% Isopropanol
0.25 % Surfynol 485
83.50% Deionized Water
8.00 % Trimethylolpropane
Kogation results are shown in FIG. VIII.

EXAMPLE 6

The formulation used in this example was as follows:
3.25 % Food Black 2
2.50% 2-pyrrolidone
2.50% Isopropanol
0.25 % Surfynol 485
81.50% Deionized Water
10.00% 2-methyl- 1,3-propanediol
Kogation results are shown in FIG. V.

EXAMPLE 7

This is still another comparative example showing kogation results obtained from an ink formulation employing a prior humectant, tdmethylolproprane at the 10% by weight level. The formulation was as follows:
3.25 % Food Black 2
2.50% 2-pyrrolidone
2.50% Isopropanol
0.25 % Surfynol 485
81.50% Deionized Water
10.00 % Trimethylolpropane
Kogation results are shown in FIG. IX.

As can be seen from the kogation results set forth graphically in FIGS. III, VII, VIII, and IX, inks formulated with prior art humectants (Examples 1, 4, 5, and 7, FIGS. III, VIII, and IX) show a significant decrease in dM/dt prior to 30 million firing cycles. Note, for example, that dM/dt for the ink employing diethylene glycol (FIG. III), a commonly used humectant, decreases rapidly at dM/dt for 18 million cycles, whereas dM/dt for TMP, disclosed in U.S. Pat. No. 5,169,437 at the 8% level (FIG. VIII), decreases rapidly at 24 million firing cycles. Even at the 10% level (FIG. IX), TMP shows a significant decrease in dM/dt (>8% at about 18 million firing cycles). Those results are to be contrasted with inks formulated according to the present invention, i.e., Examples 2, 3, and 6, FIGS. IV, V, and VI, respectively, which effectively show no decrease in dM/dt even after approximately 36 million firing cycles.

EXAMPLE 8

The inks of the present invention were tested for resistance to clogging and crusting per the method laid out in U.S. Pat. No. 5,258,066, incorporated herein by reference for all purposes. Basically, in determining crusting/anti-clogging, an ink is charged to the printer and characters are continuously printed for 10 minutes, after which printing is stopped. The printer is left to stand for 10 minutes in an uncapped state, and printing of characters again resumed. The print is then visually observed to determine defects such as blurred characters or characters with ragged edges. In all of the inks made as per the present invention and described in the foregoing examples, no crusting/clogging problems were observed.

While not wanting to be bound by any particular theory, we believe that the humectants of the present invention are able to mask deleterious ions, e.g., sodium ions, by forming thermally stable complexes with such ions.

The foregoing description and examples illustrate selected embodiments of the present invention. In light thereof, variations and modifications will be suggested to one skilled in the art, all of which are in the spirit and purview of this invention.

What is claimed is:

1. A thermal ink-jet ink comprising water, a compatible colorant, and from about 2% to about 20% by weight of a humectant selected from the group consisting of compounds having the formula:

wherein X can be an alkyl group having from 1 to 3 carbon atoms, $-NH_2$, $-CH_2NH_2$, and a cyclic ether moiety, and mixtures of such compounds.

2. The ink of claim 1 wherein X is an alkyl group.
3. The ink of claim 2 wherein said compound is 2-methyl-1,3propanediol.
4. The ink of claim 1 wherein said humectant is present in an amount of from about 8% to about 15 % by weight.
5. The ink of claim 1 wherein said water is present in an amount of from about 65 % to about 90% by weight.
6. A method of reducing kogation in an ink used in thermal ink-jet printers, said ink comprising water and a compatible colorant, characterized in that there is incorporated into said ink an effective amount of a humectant selected from the group consisting of compounds having the formula:

wherein X can be an alkyl group having from 1 to 3 carbon atoms, $-NH_2$, $-CH_2NH_2$ and a cyclic ether moiety, and mixtures of such compounds.

7. The method of claim 6 wherein said humectant is present in an amount of from about 2% to about 20% by weight.
8. The method of claim 6 wherein X is an alkyl group.
9. The method of claim 8 wherein said humectant comprises 2-methyl-1,3-propanediol.
10. The method of claim 7 wherein said humectant is present in an amount of from about 8% to about 15% by weight.
11. The method of claim 6 wherein said water is present in an amount of from about 65% to about 90% by weight.

* * * * *